United States Patent [19]

Inagaki et al.

[11] Patent Number: 5,399,821
[45] Date of Patent: Mar. 21, 1995

[54] KEYTOP FOR PUSH-BUTTON SWITCHES, AND METHOD OF MANUFACTURING SAME

[75] Inventors: Jiro Inagaki, Tokyo; Atsushi Hari, Kanagawa; Nobuyuki Yagi, Tokyo; Yasutoshi Kaku, Kanagawa; Takashi Shinoki, Tokyo, all of Japan

[73] Assignee: Teikoku Tsushin Kogyo Co., Ltd., Kanagawa, Japan

[21] Appl. No.: 138,260

[22] Filed: Oct. 20, 1993

[51] Int. Cl.6 .............................................. H01H 3/12
[52] U.S. Cl. ................................ 200/341; 200/517; 200/520; 200/302.2; 200/345; 200/5 A; 200/308; 264/257
[58] Field of Search .............................. 200/341–345, 200/520, 517, 302.2, 5 A, 308; 264/257, 274; 425/127

[56] References Cited

U.S. PATENT DOCUMENTS

| | | | |
|---|---|---|---|
| 3,594,262 | 7/1971 | Magidson | 264/257 X |
| 4,059,737 | 11/1977 | Gergaur | 200/302.2 X |
| 4,201,612 | 5/1980 | Figge et al. | 264/257 X |
| 4,216,184 | 8/1980 | Thomas | 264/257 X |
| 4,237,351 | 12/1980 | Boulanger et al. | 200/5 A |
| 4,500,218 | 2/1985 | Nishikawa | 200/308 X |
| 4,595,551 | 6/1986 | Maurer | 264/257 X |
| 4,814,561 | 3/1989 | Kawasaki | 200/517 |
| 4,839,474 | 6/1989 | Hayes-Pankhurst et al. | 200/5 A |
| 4,925,615 | 5/1990 | Willis et al. | 264/257 |
| 4,980,522 | 12/1990 | Murakami et al. | 200/302.2 X |
| 5,011,728 | 4/1991 | Imae et al. | 200/302.2 X |
| 5,057,059 | 12/1991 | Green | 264/257 X |
| 5,185,118 | 2/1993 | Siano | 264/257 |
| 5,340,956 | 8/1994 | Chen | 200/341 |

FOREIGN PATENT DOCUMENTS

483898 5/1992 European Pat. Off. .

*Primary Examiner*—Ernest G. Cusick
*Attorney, Agent, or Firm*—Wenderoth, Lind & Ponack

[57] ABSTRACT

A push-button switch keytop includes a flexible resin film deformed in such a manner that the resin film bulges upwardly to form a curved portion that is filled with a molding resin while the resin film is being deformed. The molding resin is allowed to harden to form a keytop body, whereby the top side of the keytop body consisting of the molding resin is integrated with the resin film in a state in which the top side of the keytop body is covered by the resin film. The keytop is manufactured by clamping a resin film between upper and lower molds, charging a molten resin from a pin gate provided on the lower mold into a cavity provided in the lower mold, thereby deforming and urging the resin film upward by pressure and heat produced by the molten resin and causing the resin film to adhere to the inner surface of the upper mold, filling the cavities of the upper and lower molds with the molten resin and separating the upper and lower molds after the resin hardens. An adhesive layer may be provided directly or indirectly via another printed layer on the underside of the resin film on that portion thereof where the keytop is located.

6 Claims, 5 Drawing Sheets

KEYTOP FOR PUSH-BUTTON SWITCHES, AND METHOD OF MANUFACTURING SAME

BACKGROUND OF THE INVENTION

This invention relates to the keytop of a push-button switch. More particularly, the invention relates to a push-button switch keytop, which has a small number of component parts and is capable of being reduced in size and thickness and is ideal for waterproof applications. The invention further relates to a method of manufacturing the keytop.

The reduction in the size and thickness of electronic devices that has been achieved in recent years has been accompanied by a demand to reduce the size and thickness also of the push-button switches used on the control panels of these devices.

These electronic devices include some that are used in environments in which there is the danger of humidity and moisture penetrating the interior of the device. In such case, the push-button switch also is required to have a so-called waterproof structure in which humidity and moisture will not penetrate the contact portion of the switch from the outside.

In an effort to meet these demands, a push-button switch has been proposed in which a substrate provided with a switch contact is covered with a single layer of resin film devoid of holes, a keytop comprising molding resin is placed upon the resin film and the switch contact is opened and closed via the resin film by pressing the keytop. The push-button switch having this structure is such that the resin film performs a waterproofing function to prevent water from penetrating the switch contact underlying the resin film.

However, though the above-described push-button switch has a waterproof structure, this switch requires the additional assembly step of inserting the resin film between the keytop and the switch contact, as a result of which there is a greater number of assembly steps.

Further, the keytop made of molding resin ordinarily is connected to another member (a frame) via a slender, elongated hinge, and the design is such that when the keytop is pressed, the hinge portion flexes and only the keytop recedes. However, since the keytop having this structure is provided with the hinge of a prescribed length and thickness (the hinge also is integrally molded along with the keytop and frame by means of molding resin), the extent to which the push-button switch can be reduced in size and thickness, as well as the degree to which greater integration can be achieved, diminishes correspondingly.

In order to illuminate the keytop of the push-button switch described above, a transparent material is used to manufacture the keytop and the resin film and a light-emitting element is arranged on the substrate provided with the switch contact. However, since the light emitted by the light-emitting element first passes through the resin film and then through a space at one end thereof before finally impinging upon the interior of the keytop, much of the light is lost during its travel along this path and the top side of the keytop is not illuminated efficiently.

SUMMARY OF THE INVENTION

Accordingly, an object of the present invention is to provide a keytop of a push-button switch suited to a reduction in size and thickness, as well as a method of manufacturing such a keytop, in which the number of component parts is reduced by furnishing the keytop itself with a waterproof structure, thereby facilitating the assembly operation of the push-button switch and making it possible to reduce the size and thickness of the push-button switch and achieve a higher degree of integration.

Another object of the present invention is to provide a keytop of a push-button switch in which the keytop can be illuminated efficiently by illuminating means disposed on the underside of the keytop.

According to the present invention, there is provided a keytop of a push-button switch in which the keytop is arranged above a switch contact and has an underside provided with a pushing portion for opening and closing the switch contact by pressing it, characterized in that the keytop includes a flexible resin film that is deformed in such a manner that the resin film bulges upwardly to form a curved portion that is filled with a molding resin while the resin film is being deformed, and the molding resin is allowed to harden to form a keytop body, whereby a top side of the keytop body consisting of the molding resin is integrated with the resin film in a state in which the top side of the keytop body is covered by the resin film.

Since the top side of the keytop body is thus covered by resin film that does not require any holes, absolutely no moisture or humidity can penetrate the underside of the keytop from the top side thereof. Accordingly, the keytop is ideal for use in a push-button switch having a waterproof structure.

Further, since the keytop can be formed merely by directly integrating the keytop body and the resin film, not only is the structure simplified but the spacing between keytops can be reduced as well in a case where a plurality of keytops are provided on a single sheet of resin film. This makes possible a reduction in size and a higher degree of integration. Moreover, since the resin film is thin, it makes it possible to reduce the thickness of the keytop.

According to the present invention, there is provided a method of manufacturing a keytop of a push-button switch characterized by preparing an upper mold having a cavity defining a shape identical with that of an upper portion of a keytop, a lower mold having a cavity defining a shape identical with that of a lower portion of the keytop, and a resin film, clamping the resin film between the upper mold and the lower mold, charging a molten resin from a pin gate provided on the lower mold into the cavity provided in the lower mold, thereby deforming and urging the resin film upward by pressure and heat produced by the molten resin and causing the resin film to adhere to an inner surface of the upper mold, filling the cavities of the upper and lower molds with the molten resin and separating the upper and lower molds after the molten resin hardens.

In accordance with this manufacturing method, the keytop can be manufactured merely by clamping the resin film between the upper and lower molds and then charging the resin. As a result, manufacture is facilitated greatly and the process can be raised in speed.

According to another aspect of the present invention, there is provided a keytop of a push-button switch in which the keytop is arranged above a switch contact and has an underside provided with a pushing portion for opening and closing the switch contact by pressing it, characterized in that the keytop includes a flexible resin film and an adhesive layer provided on an underside of the resin film directly or indirectly via another printed layer, the resin film is deformed in such a manner that the resin film bulges upwardly to form a curved portion that is filled with a molding resin while the resin film is being deformed, and the molding resin is allowed to harden, whereby a top side of a keytop body comprising the molding resin is integrated with the resin film in a state in which the top side of the keytop body is covered by the resin film.

Depending upon the material or thickness of the resin film and the material or melting temperature of the keytop body, or in a case where a printed layer is printed on the underside of the resin film, there will instances in which it is difficult to fuse the keytop body and the resin film directly together. In such cases, it will suffice to interpose the adhesive layer between the keytop body and the resin film.

According to another aspect of the present invention, there is provided a method of manufacturing a keytop of a push-button switch characterized by preparing an upper mold having a cavity defining a shape identical with that of an upper portion of a keytop, a lower mold having a cavity defining a shape identical with that of a lower portion of the keytop, and a resin film, providing an adhesive layer on an underside of the resin film directly or indirectly via another printed layer, clamping the resin film between the upper mold and the lower mold, charging a molten resin from pin gate provided on the lower mold into the cavity provided in the lower mold, thereby deforming and urging the resin film upward by pressure and heat produced by the molten resin and causing the resin film to adhere to an inner surface of the upper mold, filling the cavities of the upper and lower molds with the molten resin and separating the upper and lower molds after the resin hardens.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 1(A), (B) and (C) are diagrams illustrating a first embodiment of a keytop of a push-button switch according to the present invention, in which

FIGS. 4(A), (B) and (C) are diagrams illustrating a second embodiment according to the present invention, in which

FIGS. 5(A), (B) and (C) are diagrams illustrating a third embodiment according to the present invention, in which

DESCRIPTION OF THE PREFERRED EMBODIMENTS

Preferred embodiments of the present invention will now be described in detail with reference to the accompanying drawings.

Figure 1A:
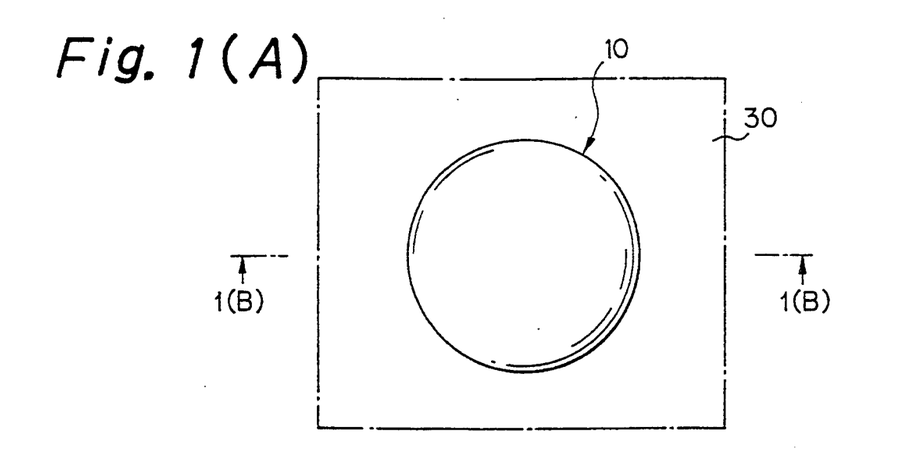
FIG. 1(A) is a plan view, FIG. 1(B) a sectional view taken along line 1(B)—1(B) of FIG. 1(A), and FIG. 1(C) a bottom view.
Figure 1B:
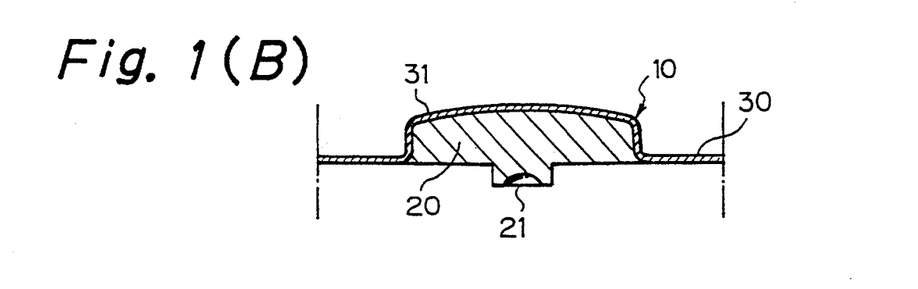
Figure 1C:
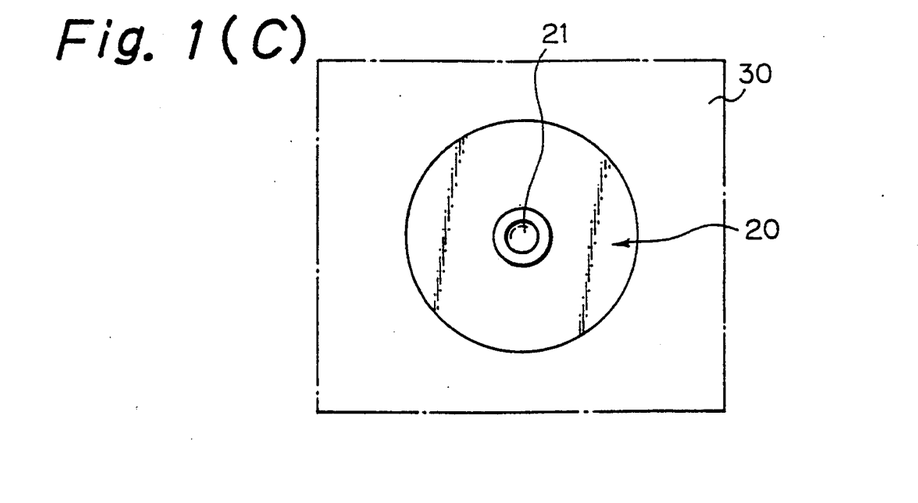

FIGS. 1(A), (B) and (C) are diagrams illustrating a first embodiment of a keytop of a push-button switch according to the present invention, in which FIG. 1(A) is a plan view, FIG. 1(B) a sectional view taken along line 1(B)—1(B) of FIG. 1(A) , and FIG. 1(C) a bottom view. As shown in FIGS. 1(A) through 1(C), a keytop 10 includes a keytop body 20 formed by a resin mold, and a resin film 30 having a curved portion 31, the keytop body 20 and the resin film 30 being integrated in a state in which the top side of the keytop body 20 is covered by the curved portion 31 of the resin film.

The keytop body 20 consists of a thermoplastic resin (e.g., polycarbonate resin, polymethyl methacrylate resin, polycylohexane dimethylene terephthalate resin, acrylic resin, AS resin, ABS resin, etc.) and has an underside centrally provided with a pushing portion 21 for pressing a switch contact. In this embodiment, the keytop 20 consists of a transparent material.

The resin film 30 consists of a flexible thermoplastic film (e.g., polyethylene terephthalate, polyethylene naphthalate, etc.). In this embodiment, the resin film 30 consists of a transparent material.

Figure 2:
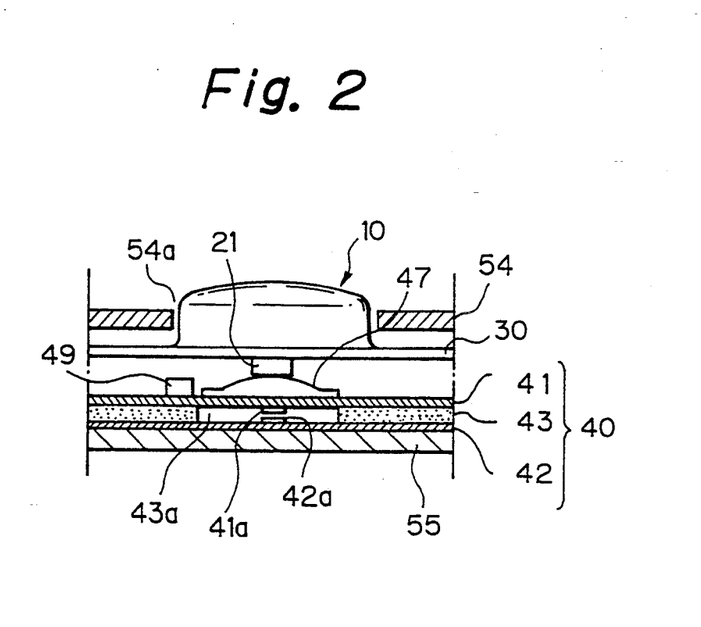
FIG. 2 is a side sectional view illustrating an example of a push-button switch one component of which is the keytop of FIG. 1.

FIG. 2 is a side sectional view illustrating an example of a push-button switch one component of which is the keytop 10 having the structure described above. In FIG. 2, numeral 40 denotes a switch substrate comprising two superimposed sheets 41, 42 and a spacer 43 interposed between the sheets 41, 42. The two sheets 41, 42 are formed to have a movable-contact pattern 41a and a fixed-contact pattern 42a, respectively. The two contact-patterns 41a, 42a are arranged to oppose each other in a hole 43a provided in the space 43, thereby constructing a switch contact.

A click spring 47 is attached to the top side of the sheet 41 on the portion thereof provided with the contact pattern 41a. The keytop 10 is disposed on the upper portion of the click spring 47. Further, a light-emitting element 49 comprising a light-emitting diode or the like is arranged on the switch substrate 40.

The keytop 10 and the switch substrate 40 are housed within a case 55, and a panel 54 is placed upon the top side of the keytop 10 and switch substrate 40.

When the keytop 10 is pressed in the above-described push-button switch, the keytop 10 recedes owing to flexing of the resin film 30 surrounding the keytop 10. When the keytop 10 recedes, the pushing portion 21 of the keytop 10 presses the click spring 47, the snap-back action of which produces a clicking sensation. In addition, the sheet 41 is pressed and moves the movable-contact pattern 41a into contact with the fixed-contact pattern 41b, thereby closing the switch. When the pressing force is removed from the keytop 10, the movable-contact pattern 41a and click spring 47 rise and return to their original positions, thereby opening the switch.

In the push-button switch described above, the keytop 10 is covered by the resin film 30, which is entirely devoid of holes (see FIG. 1). As a result, humidity or moisture that has found its way to the upper part of the keytop 10 from a hole 54a in the panel 54 cannot penetrate to the underside of the keytop 10 underlying the resin film 30. Thus, the push-button switch is provided with a Structure exhibiting an excellent waterproof property.

In this embodiment, the resin film 30 and keytop body 20 both consist of a transparent material. This means that the keytop 10 can be illuminated from its underside by the light-emitting element 49, as illustrated in FIG. 2. In particular, according to this embodiment, the light emitted by the light-emitting element 49 merely passes through the keytop 20 and the resin film 30, both of which consist of the transparent material. As a result, loss of light traveling along this path is small and the keytop 10 can be illuminated efficiently. If a desired mark is printing on the top side of the resin film 30 of the keytop 10, the mark will appear sharply when the keytop 10 is illuminated.

It should be noted that the shape of the keytop 10 need not be circular, as in this embodiment; it goes without saying that the keytop may be rectangular or polygonal in shape.

A method of manufacturing the keytop 10 will now be described.

Figure 3:
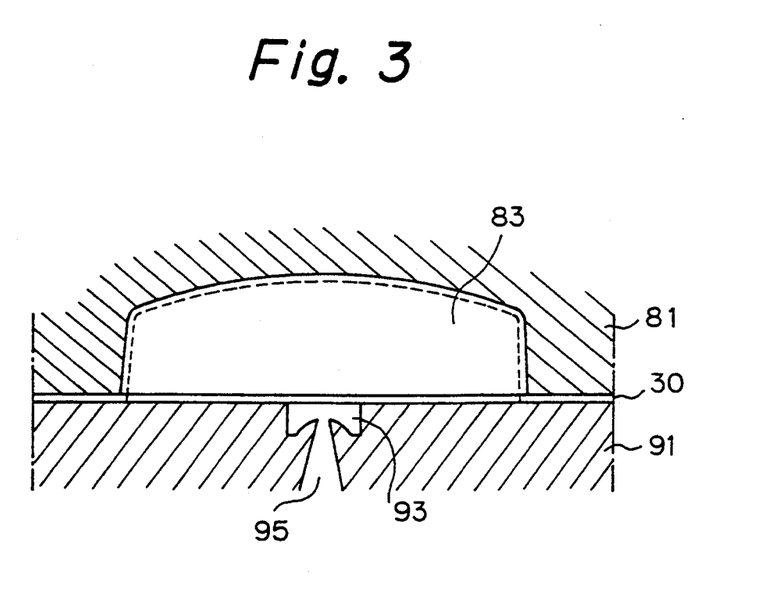
FIG. 3 is a diagram for describing a method of manufacturing the keytop.

First, the flexible thermoplastic resin film 30 is prepared and the film is then clamped between an upper mold 81 and a lower mold 91, as shown in FIG. 3. This diagram illustrates the portion corresponding to the side section taken along line 1(B)—1(B) of FIG. 1(A).

As shown in FIG. 3, the upper mold 81 is provided with a cavity 83 having a shape identical with that of the upper portion of the keytop 10, and the lower mold 91 is provided with a cavity 93 having a shape identical with that of the lower portion of the keytop 10.

A molten resin at high temperature under high pressure is charged forcibly from a pin gate 95 provided on the lower mold 91, thereby filling the cavity 93 of the lower mold 91 with the molten resin. Owing to the high-temperature and high-pressure condition of the molten resin at this time, the thermoplastic resin film 30 is deformed (caused to bulge) so as to be urged upward, whereby the molten resin flows also into the cavity 83 of the upper mold 81. In addition, the deformed resin film 30 is brought into adhering contact with the inner wall surface of the cavity 83 of the upper mold 81, as indicated by the dashed line in FIG. 3. After the molten resin hardens, the upper mold 81 and lower mold 91 are separated from each other to complete the formation of the keytop 10 depicted in FIG. 1. It should be noted that since the forcibly introduced resin (the keytop body 20) exhibits a high temperature and pressure and the resin film 30 exhibits thermoplasticity, the forcibly introduced resin fuses directly and solidly with the surface of the resin film 30 so that the resin and resin film are firmly united without any special need of an adhesive or the like. Accordingly, the resin film 30 will not peel off the keytop body 20.

Since the molten resin is charged while it deforms the resin film 30 into the shape of the inner wall surface of the cavity 83 of upper mold 81, the method of manufacturing the keytop described above is influenced by the shape of the keytop 10 and the charging conditions of the molten resin. In accordance with the above-described embodiment, a keytop having a height less then half that of its outer diameter was manufactured using a polyethylene terephthalate resin film having a thickness of 75~100 μm and a molten resin consisting of acrylic resin. The result was that the resin film 30 adhered to the inner wall surface of the cavity 83.

Further, in accordance with the above-described embodiment, it was found that high-yield molding could be achieved by making the temperature of the molten resin 240° C. and the temperature of the upper and lower molds 81, 91 approximately 80° C., making the injection time of the molten resin approximately 3 sec and the cooling time thereof approximately 10 sec, and setting the injection pressure and injection speed of the injection molding machine to 1400 kg and 15 mm/sec, respectively.

In the case of the first embodiment, there are instances where the fusion between the resin film 30 and keytop body 20 is weak, depending upon the material and thickness of the resin film 30 or the material and melting temperature of the keytop body 20. In such case, the union between the resin film 30 and keytop body 20 can be strengthened if an adhesive layer 35 is interposed between them, as in the second embodiment described below.

Figure 4A:
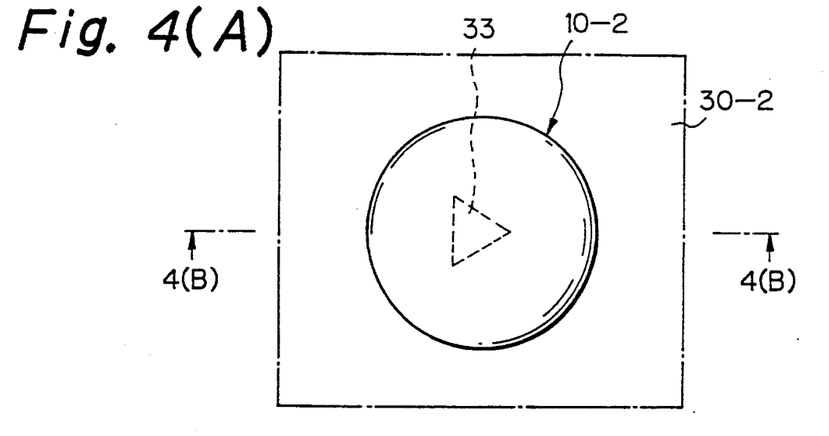
FIG. 4(A) is a plan view, FIG. 4(B) a sectional view taken along line 4(B)—4(B) of FIG. 4(A), and FIG. 4(C) a bottom view.
Figure 4B:
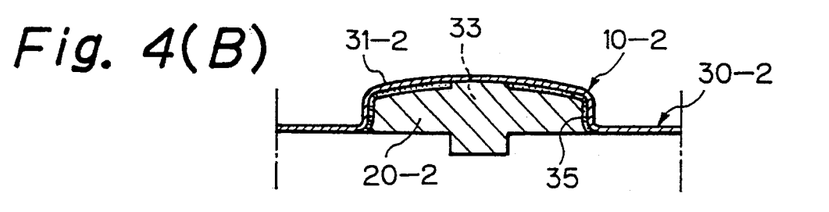
Figure 4C:
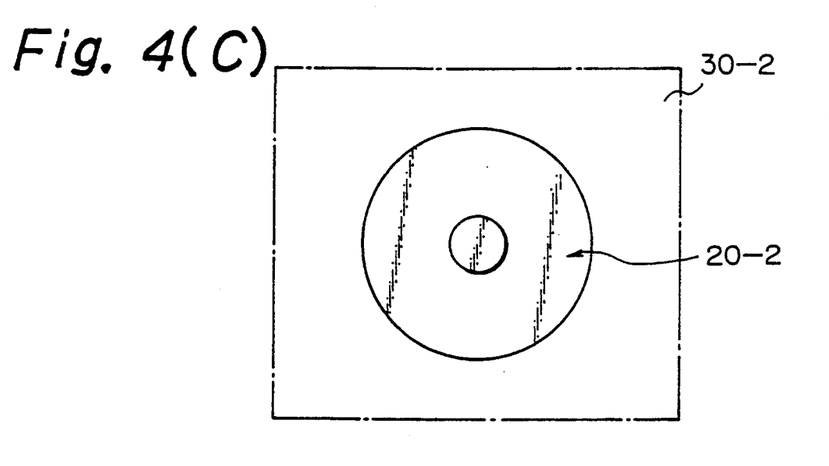

FIGS. 4(A), (B) and (C) are diagrams illustrating a second embodiment of the present invention, in which FIG. 4(A) is a plan view, FIG. 4(B) a sectional view taken along line 4(B)—4(B) of FIG. 4(A), and FIG. 4(C) a bottom view. Here a keytop 10-2 also includes a keytop body 20-2 formed by a resin mold, and a resin film 30-2 having a curved portion 31-2, the keytop body 20-2 and the resin film 30-2 being integrated in a state in which the top side of the keytop body 20-2 is covered by the curved portion 31-2 of the resin film. In these respects the second embodiment is the same as the first embodiment. The materials and method of manufacture also are approximately the same, though there is difference.

Specifically, this embodiment differs from the first embodiment in that an adhesive layer 35 is provided between the keytop body 20-2 and the resin film 30-2. The adhesive layer 35 is provided substantially over the entirety of the inner surface of the curved portion 31-2 of the resin film 30-2. The central part of the adhesive layer 35 is provided with a triangular portion 33 where the layer 35 is absent. The adhesive layer 35 is colored and consists of a bonding agent such as epoxy resin or urethane resin.

The adhesive layer 35 is shown to have considerable thickness in FIG. 4 for the sake of the description. In actuality, however, the adhesive layer 35 is fairly thin (e.g., 10~50 μm) in comparison with the resin film 30-2.

In order to manufacture the keytop 10-2, the adhesive layer 35 is provided by applying beforehand a coating of a bonding agent to the underside of the resin film 30-2, which is a flat sheet before it is deformed, on the portion thereof where the keytop 10-2 will be located. At this time the triangular portion 33 [see FIGS. 4A and 4B] devoid of the adhesive layer 35 is formed in the adhesive layer 35.

By using the upper mold 81 and lower mold 91 shown in FIG. 3, the resin film 30-2 is clamped between the molds and the molten resin is charged from the pin gate 95 of the lower mold 91 and allowed to harden. The result will be the keytop 10-2 having the structure shown in FIG. 4.

In this embodiment, the forcibly introduced molten resin (the keytop body 20-2) and the resin film 30-2 are bonded together by the adhesive layer 35. As a result, the keytop body 20-2 and the resin film 30-2 are united reliably irrespective of the such factors as the materials used, and the resin film 30-2 will not peel off the keytop body 20-2.

In accordance with this embodiment, the colored adhesive layer 35 is provided with the portion 33 devoid of the adhesive layer. Accordingly, if the keytop body 20-2 and the resin film 30-2 consist of transparent materials, the portion 33 devoid of the adhesive layer 35 can be seen distinctly from above the keytop 10-2. Moreover, if the keytop 10-2 is illuminated from its underside by the light-emitting element 49, as illustrated in FIG. 2, the portion 33 devoid of the adhesive layer 35 can be made visible even more clearly and provides a more attractive appearance.

Though the portion 33 devoid of the adhesive layer 35 has the shape of a symbol in this embodiment, the adhesive layer 35 itself may be provided with a desired shape instead. Furthermore, if a symbol is unnecessary, the adhesive layer 35 may be applied over the entirety of the inner surface of the curved portion 31-2 without leaving any portion thereof uncoated.

Figure 5A:
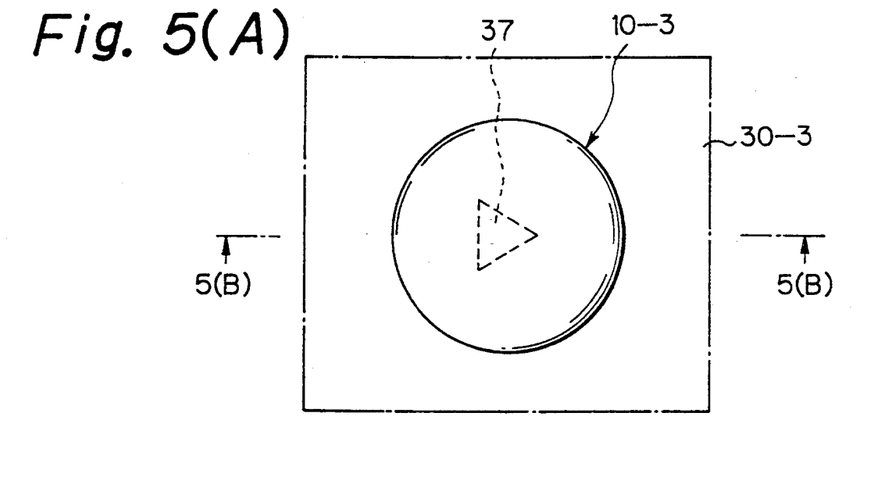
FIG. 5(A) is a plan view, FIG. 5(B) a sectional view taken along line 5(B)—5(B) of FIG. 5(A) , and FIG. 5(C) a bottom view.
Figure 5B:
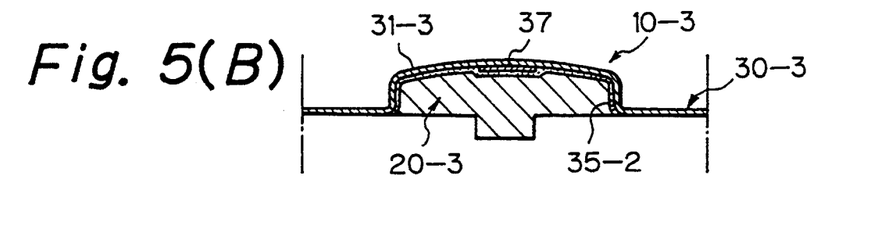
Figure 5C:
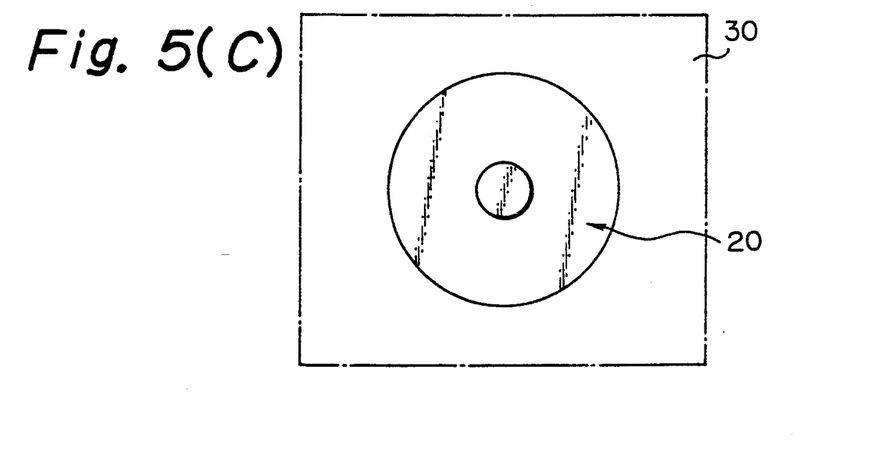

FIGS. 5(A), (B) and (C) are diagrams illustrating a third embodiment of the present invention, in which FIG. 5(A) is a plan view, FIG. 5(B) a sectional view taken along line 5(B)—5(B) of FIG. 5(A), and FIG. 5(C) a bottom view. Here a keytop 10-3 also includes a keytop body 20-3 formed by a resin mold, and a resin film 30-3 having a curved portion 31-3, the keytop body 20-3 and the resin film 30-3 being integrated in a state in which the top side of the keytop body 20-3 is covered by the curved portion 31-3 of the resin film. In these respects the second embodiment is the same as the first and second embodiments. The materials and method of manufacture also are approximately the same. In addition, as in the second embodiment, the keytop 10-3 has an adhesive layer 35-2 provided between the keytop body 20-3 and the resin film 30-3.

This embodiment differs from the second embodiment in that, instead of providing the portion 33 devoid of the adhesive layer [see FIGS. 4(A) and 4(B)], this portion of the resin film 30-3 is printed to have a design 37 or the like. The design may be printed using any type of printing means, such as means relying upon silk printing, pad printing or offset printing.

The adhesive layer 35 is provided over the entire inner surface of the curved portion 31-1 so as to cover the design 37. When the molten resin is injected from the underside of the resin film 30-3 in order to manufacture the keytop 10-3, the molten resin does not come directly into contact with the design 37 covered by the adhesive layer 35-2. As a consequence, the design 37 is not directly subjected to the heat and pressure of the molten resin and, hence, the design 37 is not deformed or caused to deteriorate. In accordance with this embodiment, the design 37 can be illuminated from the lower side of the keytop 10-3 if the adhesive layer 35-2 is made transparent.

The design 37 is provided on the underside of the resin film 30-3 (in the same manner as the portion devoid of the adhesive layer 35 shown in FIG. 4). Therefore, even though the keytop 10-3 is pushed down from the upper side by a finger or the like to operate the push-button switch, the design 37 is not contacted directly by the finger and cannot be rubbed off.

Figure 6:
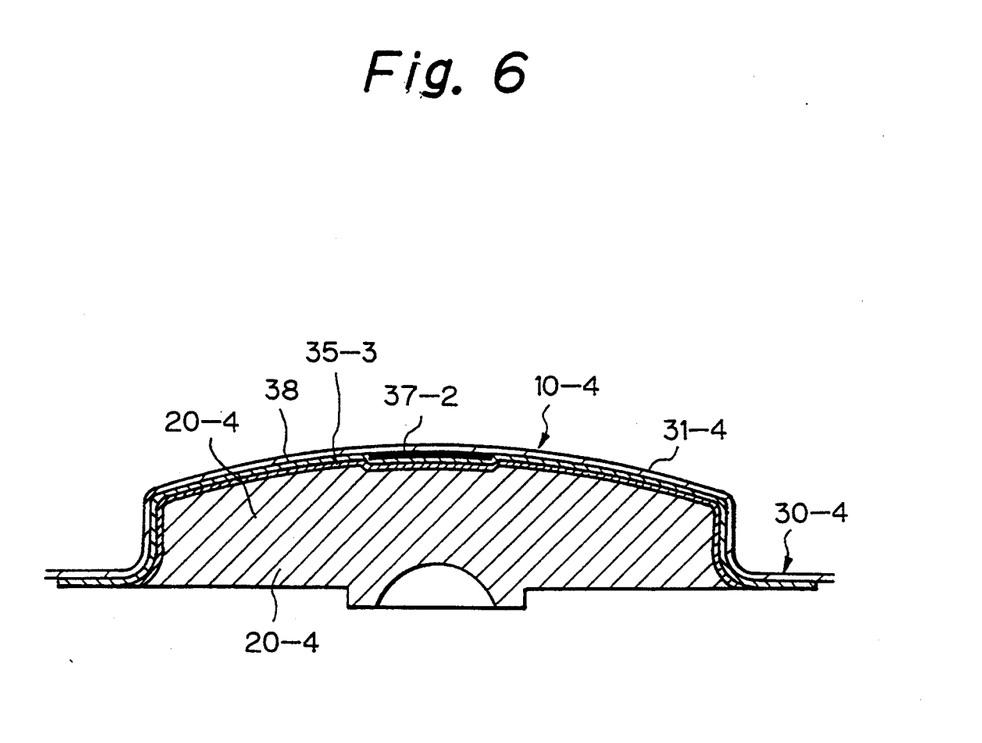
FIG. 6 is a side sectional view showing a fourth embodiment of the present invention.

FIG. 6 is a side sectional view illustrating a fourth embodiment of the present invention. Here a keytop 10-4 also includes a keytop body 20-4 formed by a resin mold, and a resin film 30-4 having a curved portion 31-4, the keytop body 20-4 and the resin film 30-4 being integrated in a state in which the top side of the keytop body 20-4 is covered by the curved portion 31-4 of the resin film. In these respects the fourth embodiment is the same as the first, second and third embodiments. The materials and method of manufacture also are approximately the same, though there is a difference.

Specifically, this embodiment differs from the third embodiment in that a printed layer 38 is printed between a design 37-2 or the like and an adhesive layer 35-3. A material such as urethane resin is used as the design 37-2 and printed layer 38, and a material such as urethane resin is used also as the adhesive layer 35-3.

If the keytop 10-4 is designed using the design 37-2 or the like and the printed layer 38 that are separate of the adhesive layer 35-3, the keytop can be designed with a greater degree of freedom.

As many apparently widely different embodiments of the present invention can be made without departing from the spirit and scope thereof, it is to be understood that the invention is not limited to the specific embodiments thereof except as defined in the appended claims.

What is claimed is:

1. A push-button switch keytop arranged above a switch contact and having an underside provided with a pushing portion for opening and closing a switch contact by pressing the switch contact, comprising a flexible resin film and a keytop body, wherein said flexible resin film is deformed by injecting a molding resin in such a manner that said resin film bulges upwardly to form a curved portion that is filled with the molding resin while said resin film is being deformed, and the molding resin is allowed to harden to form said keytop body, whereby a top side of said keytop body consisting of the molding resin is integrated with said resin film in a state in which the top side of said keytop body is covered by said resin film.

2. A method of manufacturing a push-button switch keytop, comprising the steps of:
    preparing an upper mold having a cavity defining a shape identical with that of an upper portion of a keytop, a lower mold having a cavity defining a shape identical with that of a lower portion of the keytop, and a resin film;
    clamping said resin film between said upper mold and said lower mold;
    charging a molten resin from a pin gate provided on said lower mold into the cavity provided in said lower mold, thereby deforming and urging said resin film upward by pressure and heat produced by the molten resin and causing said resin film to adhere to an inner surface of said upper mold;
    filling the cavities of said upper and lower molds with the molten resin; and
    separating said upper and lower molds after said molten resin hardens.

3. A push-button switch keytop arranged above a switch contact and having an underside provided with a pushing portion for opening and closing a switch contact by pressing the switch contact, comprising a flexible resin film having an underside, an adhesive layer provided directly on the underside of said resin film, and a keytop body, wherein said flexible resin film is deformed by injecting a molding resin in such a manner that said resin film bulges upwardly to form a curved portion that is filled with the molding resin while said resin film is being deformed, and the molding resin is allowed to harden to form said keytop body, whereby a top side of said keytop body consisting of the molding resin is integrated with said resin film in a state in which the top side of said keytop body is covered by said resin film.

4. A push-button switch keytop arranged above a switch contact and having an underside provided with a pushing portion for opening and closing a switch contact by pressing the switch contact, comprising a flexible resin film having an underside, a printed layer, an adhesive layer provided on the underside of said resin film indirectly via said printed layer, and a keytop body, wherein said flexible resin film is deformed by injecting a molding resin in such a manner that said resin film bulges upwardly to form a curved portion that is filled with the molding resin while said resin film is being deformed, and the molding resin is allowed to harden to form said keytop body, whereby a top side of said keytop body consisting of the molding resin is integrated with said resin film in a state in which the top side of said keytop body is covered by said resin film.

5. A method of manufacturing a push-button switch keytop, comprising the steps of:
preparing an upper mold having a cavity defining a shape identical with that of an upper portion of a keytop, a lower mold having a cavity defining a shape identical with that of a lower portion of the keytop, and a resin film;
directly providing an adhesive layer on an underside of said resin film;
clamping said resin film between said upper mold and said lower mold;
charging a molten resin from a pin gate provided on said lower mold into the cavity provided in said lower mold, thereby deforming and urging said resin film upward by pressure and heat produced by the molten resin and causing said resin film to adhere to an inner surface of said upper mold;
filling the cavities of said upper and lower molds with the molten resin; and
separating said upper and lower molds after said molten resin hardens.

6. A method of manufacturing a push-button switch keytop, comprising the steps of:
preparing an upper mold having a cavity defining a shape identical with that of an upper portion of a keytop, a lower mold having a cavity defining a shape identical with that of a lower portion of the keytop, and a resin film;
providing an adhesive layer on an underside of said resin film via a printed layer;
clamping said resin film between said upper mold and said lower mold;
charging a molten resin from a pin gate provided on said lower mold into the cavity provided in said lower mold, thereby deforming and urging said resin film upward by pressure and heat produced by the molten resin and causing said resin film to adhere to an inner surface of said upper mold;
filling the cavities of said upper and lower molds with the molten resin; and
separating said upper and lower molds after said molten resin hardens.

* * * * *